US006282608B1

United States Patent
Dziekan et al.

(10) Patent No.: US 6,282,608 B1
(45) Date of Patent: Aug. 28, 2001

(54) COMPACT DISC PLAYER WITH SECURITY SYSTEM FOR SELECTIVELY PREVENTING EJECTION OF A COMPACT DISC AND RELATED METHOD

(75) Inventors: Lee M. Dziekan, Metamora; James P. Muccioli, Farmington Hills; Lawrence A. Warren, Grosse Pointe; James E. Van Hout, Auburn Hills, all of MI (US)

(73) Assignee: Chrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/193,052

(22) Filed: Nov. 16, 1998

(51) Int. Cl.$^7$ ..................................................... G06F 12/14
(52) U.S. Cl. ............................ 711/112; 369/21; 369/77.1; 369/53.21
(58) Field of Search ..................... 369/21, 77.1, 53.21; 455/345; 711/111, 112, 163; 340/568.1

(56) References Cited

U.S. PATENT DOCUMENTS

| | | | |
|---|---|---|---|
| 4,527,405 | 7/1985 | Renick et al. | 70/14 |
| 4,589,101 | 5/1986 | Schatteman et al. | 369/38 |
| 4,616,490 | 10/1986 | Robbins | 70/14 |
| 4,683,462 | 7/1987 | Takeda et al. | 340/571 |
| 4,759,424 | 7/1988 | Rolleri | 180/287 |
| 4,856,304 | 8/1989 | Derman | 70/14 |
| 4,884,646 | 12/1989 | Zambias | 180/90 |
| 5,073,943 | * 12/1991 | Chapman | 381/86 |
| 5,107,244 | 4/1992 | Minamide et al. | 340/426 |
| 5,107,474 | 4/1992 | Ishibashi et al. | 369/36 |
| 5,142,522 | 8/1992 | Muramatsu et al. | 369/75.2 |
| 5,159,585 | 10/1992 | Ikedo et al. | 369/36 |
| 5,184,489 | 2/1993 | Squires et al. | 70/58 |
| 5,222,007 | 6/1993 | Suzuki et al. | 360/137 |
| 5,280,463 | 1/1994 | Okajima et al. | 369/36 |
| 5,524,859 | 6/1996 | Squires et al. | 248/551 |
| 5,548,163 | 8/1996 | French | 307/102 |
| 5,574,705 | 11/1996 | Suzuki | 369/36 |
| 5,732,237 | * 3/1998 | Ikeda | 711/112 |
| 5,835,015 | * 11/1998 | Ikeda | 340/568.1 |

* cited by examiner

Primary Examiner—Aristotelis M. Psitos
(74) Attorney, Agent, or Firm—Roland A. Fuller III

(57) ABSTRACT

In accordance with this invention, a security feature that protects against theft of compact discs ("CDs") left in a compact disc player in a vehicle is implemented in a conventional compact disc player that has a CD insertion/ejection servo mechanism, a controller that controls the compact disc player including the insertion/ejection servo mechanism, and an eject switch coupled to the controller. The controller is configured so that it knows the state of the ignition switch, typically from a signal or data from a controller in the vehicle, such as a body controller, engine controller or transmission controller. The controller senses whether the eject switch is actuated when the ignition switch is turned from off to on. Each time that the controller senses that the eject switch is actuated when the ignition switch is turned from off to on, the controller transitions between a security off state and a security on state. When in the security on state, the controller responds to the eject switch being actuated to cause the insertion/ejection servo mechanism to move to the eject position to eject a CD held in the insertion/ejection servo mechanism only if the ignition switch is also on. When in the security off state, the controller will cause the insertion/ejection servo mechanism to move to the eject position to eject a CD when the eject switch is actuated regardless of whether the ignition switch is on or off.

2 Claims, 2 Drawing Sheets

COMPACT DISC PLAYER WITH SECURITY SYSTEM FOR SELECTIVELY PREVENTING EJECTION OF A COMPACT DISC AND RELATED METHOD

BACKGROUND OF THE INVENTION

This invention relates to compact disc players, and more particularly to a securing a compact disc (CD) or discs in a compact disc player in a vehicle to protect against theft of the CD.

Compact disc players have become popular items to have in motor vehicles. On occasion, a CD or CDs will be left in the compact disc player when the vehicle is shut-off. This can make CDs left in the compact disc player more susceptible to theft, depending on where the compact disc player in mounted in the vehicle. Compact disc players are provided with eject switches which, when actuated, cause the CD(s) received in the compact disc player to be ejected. Consequently, if the compact disc player is mounted in a location where it may be readily accessible, such as in the dashboard of a vehicle left with unlocked doors or a convertible left with its top down, a thief can easily retrieve any CDs left in the compact disc player simply by actuating the eject switch. On the other hand, if the compact disc player is mounted in a relatively secure location in the vehicle, such as in the trunk of the vehicle, it is more difficult for a thief to get access to the compact disc player to retrieve any CDs left in it.

It is an objective of this invention to provide a security feature in a compact disc player that protects against the theft of CDs left in the compact disc player when the compact disc player is in an unsecure environment.

It is also an objective of this invention to provide a security feature in a compact disc player that is easily switched between an "on" state and an "off" in an authorized manner.

It is also an objective of this invention to implement the security feature in a manner that minimizes the additional costs to add it to existing compact disc player designs.

In accordance with this invention, a security feature that protects against theft of compact discs ("CDs") left in a compact disc player in a vehicle is implemented in a conventional compact disc player that has a CD insertion/ejection servo mechanism, a controller that controls the compact disc player including the insertion/ejection servo mechanism, and an eject switch coupled to the controller. The controller is configured so that it knows the state of the ignition switch, typically from a signal or data from a controller in the vehicle, such as a body controller, engine controller or transmission controller. The controller senses whether the eject switch is actuated when the ignition switch is turned from off to on. Each time that the controller senses that the eject switch is actuated when the ignition switch is turned from off to on, the controller transitions between a security off state and a security on state. When in the security on state, the controller responds to the eject switch being actuated to cause the insertion/ejection servo mechanism to move to the eject position to eject a CD held in the insertion/ejection servo mechanism only if the ignition switch is also on. When in the security off state, the controller will cause the insertion/ejection servo mechanism to move to the eject position to eject a CD when the eject switch is actuated regardless of whether the ignition switch is on or off.

BRIEF DESCRIPTION OF THE DRAWINGS

Additional features and advantages of the invention will become apparent to those skilled in the art upon consideration of the following detailed description of a preferred embodiment exemplifying the best mode of carrying out the invention as presently perceived. The detailed description particularly refers to the accompanying figures in which.

DETAILED DESCRIPTION

Figure 1:
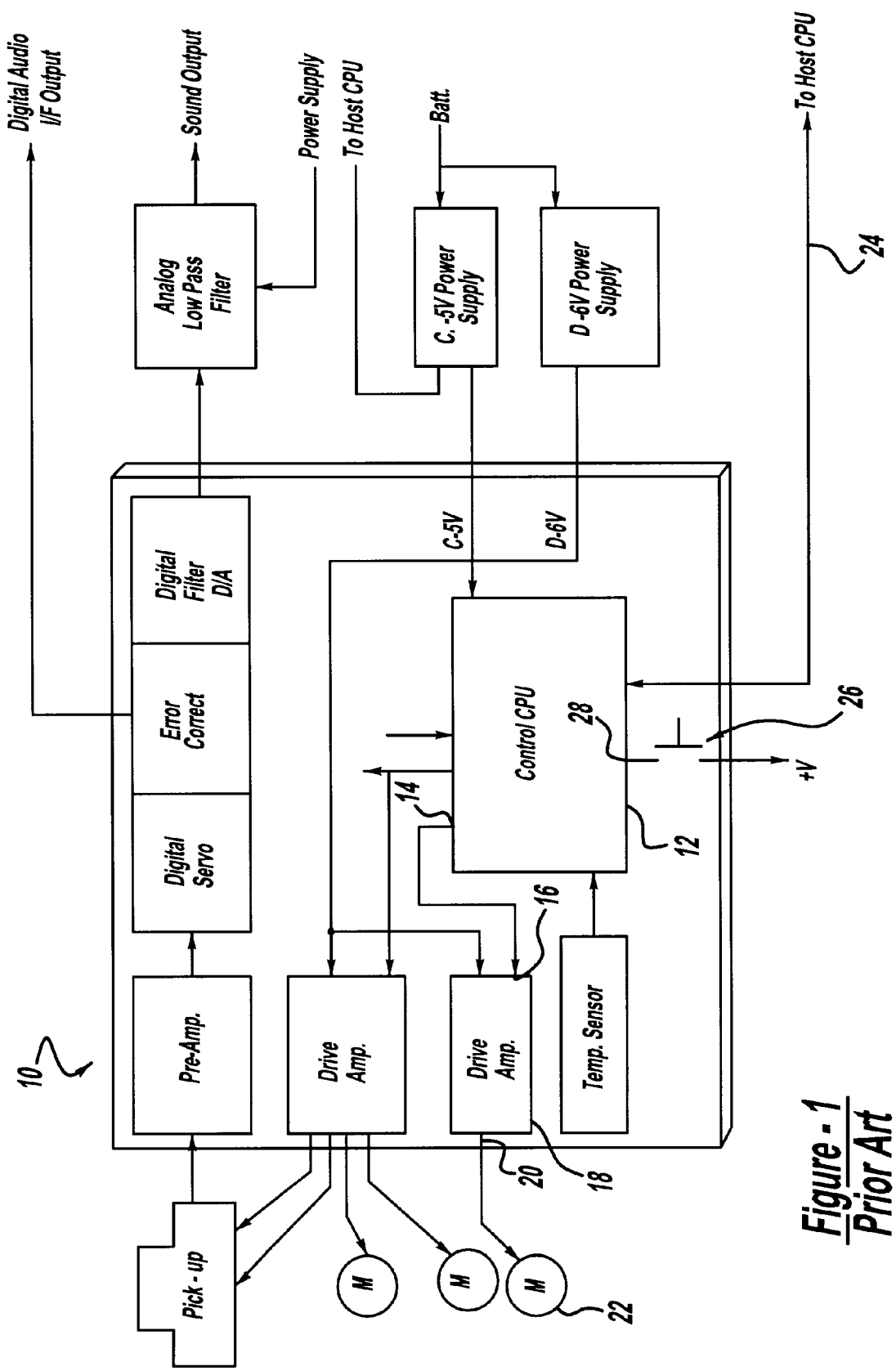
FIG. 1 is a block diagram of a compact disk player.

FIG. 1 is a block diagram of a prior art CD player 10 that can be modified to incorporate this invention. The elements of CD player 10 are well known to those skilled in the art so only the elements of CD player 10 that are of pertinence to the description of the this invention will be discussed. In this regard, CD player 10 includes a control central processing unit ("CPU") 12 having an output 14 coupled to a control input 16 of a drive amplifier 18. Drive amplifier 18 has a drive output 20 coupled to an insert/eject motor 22. CPU 12 is also coupled to a host controller (not shown) of a vehicle (not shown) in which CD player 10 is installed by a communication line (or lines) 24. An eject button 26 is coupled to an input 28 of CPU 12.

As is known, when a CD (not shown) is inserted into CD player 10, CPU 12 energizes drive amplifier 20 to drive motor 22 in a first direction to move the CD into CD player 10. When eject button 26 is pushed, CPU 12 responds by energizing drive amplifier 16 to drive motor 22 in a second direction opposite the first direction to eject the CD from CD player 10.

Figure 2A:
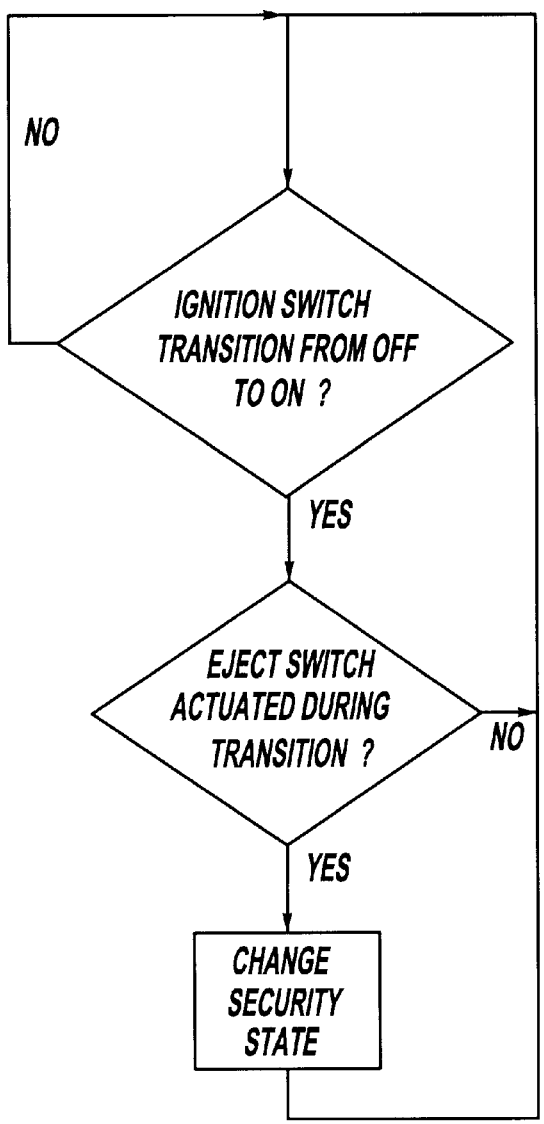
FIGS. 2A & B are flow charts of a program implementing the security feature of this invention.

Referring to FIGS. 2A & B, the security feature invention as implemented by programming CPU 12 is described. With reference to FIG. 2A, the method by which CD player 10 transitions between the security states is described. CPU 12 checks to see if the vehicle ignition switch (not shown) has transitioned from off to on. Illustratively, CPU 12 receives a data message from a host controller of the vehicle via communication line(s) 24 which indicates the status of the vehicle ignition switch. If CPU 12 determines that the vehicle ignition switch has transitioned from off to on, it next checks to see if eject switch 26 was actuated during the transition and if so, changes the security state, illustratively by changing a memory flag that indicates the status of the security state. If the security state was on, it is changed to off and if it was off, it is changed to on.

Figure 2B:
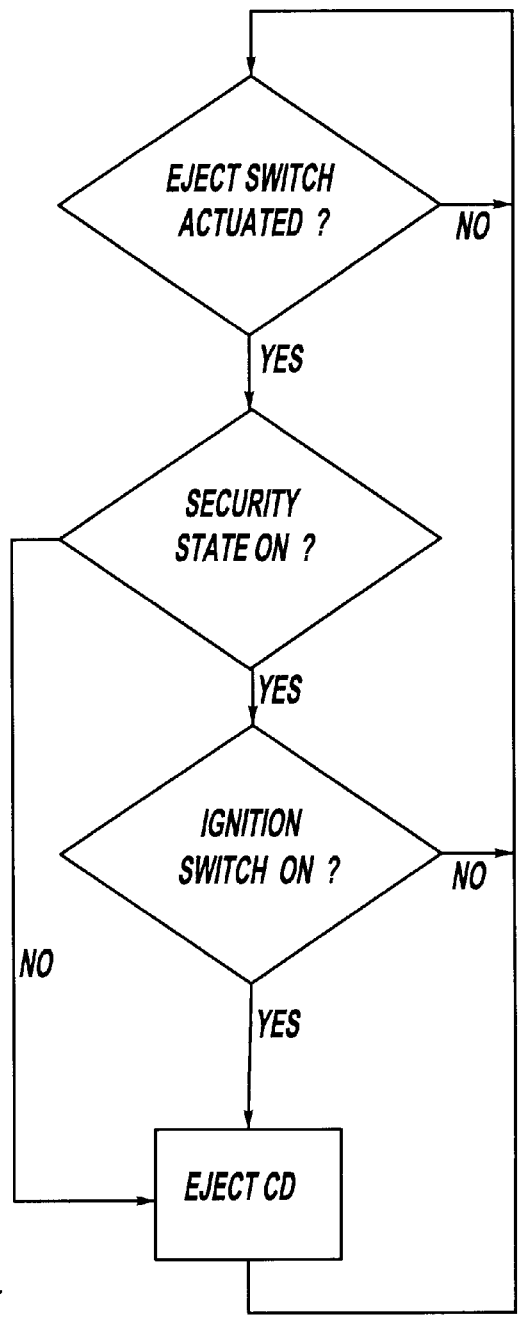

FIG. 2B shows the operation of CD player 10 in both the security "on" and "off" states. CPU 12 checks to see if eject switch 26 has been actuated. If so, CPU 12 checks to see if the security state for CD player 10 is "on" or "off." If CD player 10 is in the security state "off" mode, CPU 12 then energizes drive amplifier 16 in the eject direction to cause any CD received in CD player 10 to be ejected. If CPU 12 determines that CD player 10 is in the security state "on" mode, CPU 12 then checks to see if the vehicle ignition switch is on and if it is, causes CD player 10 to eject any CD received in it. If the vehicle ignition switch is not on, CPU 12 by-passes the "eject" step so that CD player 10 does not eject a CD.

Although the invention has been described in detail with reference to certain preferred embodiments and specific examples, variations and modifications exist within the scope and spirit of the invention as defined in the following claims.

What is claimed is:

1. A compact disc player for a vehicle, the compact disc player having a security system comprising:

a. an eject mechanism for ejecting a compact disc received in the compact disc player, the eject mechanism controlled by an eject switch;

b. the compact disc player having a controller having first and second inputs, the first input coupled to the eject switch and the second input coupled to an ignition switch of the vehicle;

c. the compact disc player having an output coupled to the eject mechanism, the eject mechanism, when actuated by the controller, ejecting the compact disc received in the compact disc player;

d. the controller sensing whether the eject switch is actuated when the ignition switch is switched from off to on and transitioning between a security off state and a security on state each time the ignition switch is switched from off to on with the eject switch actuated; and e. the controller, when in the security on state, actuating the eject mechanism to eject the compact disc received in the compact disc player in response to the eject switch being actuated only if the ignition switch is also on and, when in the security off state, actuating the eject mechanism to eject the compact disc received in the compact disc player in response to the eject switch being actuated regardless of whether the ignition switch is on or off.

2. In a compact disc player for a vehicle, a method for providing security for a compact disc received in the compact disc receiving and eject mechanism of the compact disc player, comprising the steps of:

a. transitioning between a security on state and a security off state each time an ignition switch of the vehicle is switched from off to on when an eject button of the compact disc player is actuated; and b. when in the security on state, ejecting a compact disc received in the compact disc player only if the ignition switch is on when the eject switch is actuated and, when in the security off state, ejecting the compact disc received in the compact disc player when the eject switch is actuated regardless of whether the ignition switch is on or off.

* * * * *